United States Patent Office 2,994,538
Patented Aug. 1, 1961

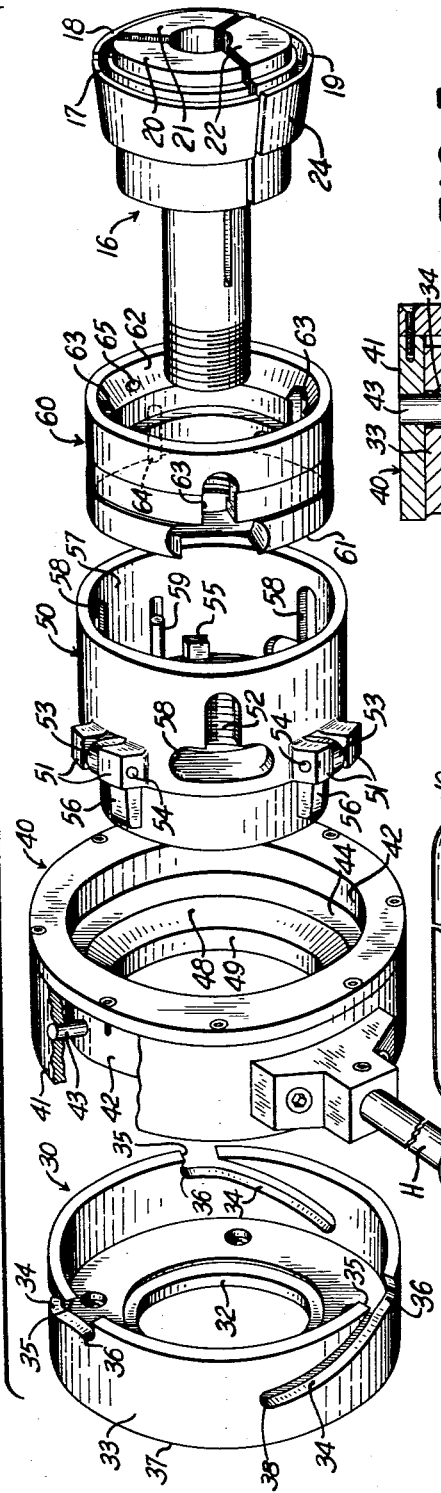

2,994,538
COLLET CHUCK HAVING AN AXIALLY
STATIONARY COLLET
Lawrence Farnsworth, Racine, Wis., assignor, by direct and mesne assignments, to Heinrich Tools, Inc., Racine, Wis., a corporation of Wisconsin
Filed Feb. 20, 1959, Ser. No. 794,748
12 Claims. (Cl. 279—50)

This invention relates generally to collet chucks for gripping workpieces that are to be machined in lathes or other machine tools. More particularly, the invention is directed to improved means for actuating the jaws of the collet and finds greatest utility in collet chucks for use where very close tolerances of the finished workpiece are required, particularly in regard to axial dimensions thereof.

In conventional collet chucks, the collet usually has a tapered surface and the contractible spring jaws are actuated by axial movement of the tapered collet surface over a closer which has a tapered surface complementary to the collet taper. Axial shifting of the collet to open or close its jaws is usually accomplished, for example, by a collet actuating tube which extends through the spindle of the machine.

In many machine operations it is essential to maintain certain axial locations and dimensions of shoulders or bores of a workpiece within very close tolerances. In setting up the movable tool carriage to perform an operation on the workpiece held by the chuck, the travel of the tool relative to the collet is set for a definite operation. There may be a production run of one hundred pieces in which pieces a certain axial bore depth is required to be held within a tolerance of less than a thousandth of an inch. There may also be a tolerance of two thousandths of an inch permitted on the diameter of these one hundred pieces, by which diameter the workpiece is grasped by the jaws of the collet. Because of this variation of diameter of these workpieces, conventional collets of the axially shiftable type have been unable to hold each workpiece in an exact axial position relative to the cutting tool so as to insure a precise depth of bore in each workpiece. In other words, a variation in diameter of two thousandths of an inch between two workpieces will result in a difference of as much as four thousandths of an inch in the axial position of these pieces in respect to the cutting tool. This is because the axially shiftable type collet occupies a different axial position, relative to the predetermined stop setting of the tool, for different diameters of workpieces held thereby. While the variation in the axial position of these axially shiftable tapered collets is small, it nevertheless does limit the tolerances which can be held on axial dimensions of various workpieces.

Accordingly, the present invention provides a collet chuck assembly having an expansible and contractible spring-jaw collet, which collet remains in the same axial location in the machine, regardless of the diameter of the workpiece held thereby. More particularly, the invention contemplates a collet closer that is shifted relative to the axially stationary collet to thereby actuate the latter.

Another more specific aspect of the present invention contemplates a collet chuck of the above type, having an axially shiftable collar which acts through shiftable means to thereby cause shifting of the collet closer. The arrangement is such so as to provide a double leverage mechanical advantage for easy, positive and rapid operation of the collet.

The invention furthermore provides a collet which is fixed in a naxial direction as far as opening and closing the collet jaws are concerned, but which has means for quickly adjusting the axial position of the collet for varying the pressure exertable by the collet jaws on any one workpiece.

Still another aspect of the invention contemplates the provision of a collet chuck having an oversized nose in which is contained the actuating mechanism for an axially fixed collet.

These and other objects and advantages of the present invention will appear hereinafter as this disclosure progresses, reference being had to the acompanying drawings, in which;

FIGURE 1 is an exploded, perspective view of a collet chuck made in accordance with the present invention;

FIGURE 2 is a side elevational view, in section, showing the chuck as assembled on a machine tool; and FIGURE 3 is an enlarged, fragmentary, sectional view of a portion of the chuck as shown in FIGURE 2, but when moved to a collet open position.

Referring in greater detail to the drawings, the collet chuck has been shown for illustrative purposes as mounted in the headstock housing 10 of a lathe and through which housing extends the externally threaded end of a drive spindle 12. The spindle is rotatably mounted on anti-friction bearings 13, and is locked against axial movement in the housing by the lock collars 15 which are secured to the spindle and abut against the inner races of bearings 13. The spindle is driven in any conventional manner, such as through a pulley 11 secured thereto.

Extending through the spindle is a collect tube 14 which is internally threaded to securely receive a conventional collet 16 that extends outwardly past the spindle. The collet includes three spring jaws 17, 18 and 19 which have been shown as containing replaceable soft jaws 20, 21 and 22. The outside of the spring jaws are defined by an annular tapered surface 24. For a more complete description of these soft jaws and the method of making them, reference may be had if deemed necessary or desireable, to my co-pending U.S. application Serial No. 777,661, filed December 2, 1958, now U.S. Patent No. 2,994,539 issued on August 1, 1961, and entitled "Collet Assembly with Replaceable Soft Jaws and Method of Making Same." It is believed sufficient to say for purposes of this disclosure, however, that these jaws have a surface 23 against which the workpiece may be axially held and located in respect to the collet. The present invention however, is not limited to use with these replaceable soft jaws.

In accordance with the present invention the collet 16 and its tube 14 are axially fixed with respect to the housing 10 as far as effecting expansion or contraction of the spring jaws is concerned. However, the collet and its tube may be axially adjustable in the machine for set-up purposes or for adjusting the pressure exertable by the jaws on any one workpiece, but they are not axially moved to actuate the jaws of the collet when grasping or releasing a workpiece. This means for axially securing the collet but permitting its adjustment is as follows.

The rear end of the spindle terminates in an enlarged portion 25 which has a series of circumferentially spaced grooves 26 in its periphery. The end of the collet tube 14 extends past the spindle and terminates in a threaded portion on which is engaged an adjusting wheel or disc 27. A screw 28 extends into the disc 27 and urges a brass plug 29 into jamming engagement with the threaded portion of the collet tube. The arrangement is such that after the disc has been axially positioned on the collet tube in the initial set-up position, the screw 28 is tightened to jam the soft plug into the collet threads so that thereafter the disc and collet tube can be rotated as a unit to axially move the collet 16 by its threaded connection at the other end of the collet tube within the spindle. An adjustable connection is provided between the collet tube 14 and the spindle 12 by means of a set screw S which threadably extends through the disc for engagement in any one of the grooves 26 of the spindle. Thus the collet tube may be rotatably adjusted relative to the spindle and then locked to it for rotation therewith. In this manner the collet is axially fixed but is also axially adjustable to vary its holding pressure on a given workpiece.

Means will now be described for moving a closer over the axially stationary collet to thereby radially move the collet spring jaws.

A cam track containing member in the form of a cup 30 is rigidly secured to the housing 10 by screws 31, and the spindle and collet extend through its central opening 32. The axially extending flange 33 contains three circumferentially spaced cam slots 34 which have inlet openings 35 and also have a relief portion 36. The back wall 37 of the cup fits tightly against the housing and the cup thus forms a stationary reaction member.

An oscillatable and axially shiftable collar 40 is adapted to be mounted on the machine by receiving the cup flange 33 in the annular space between the collar's outer flange 41 and its inner flange 42. Three pins 43 are fixed to and extend between the spaced collar flanges 41 and 42 and these pins register with and are engageable in the cam slots 34. The collar is inserted over the cup by first aligning the pins 43 with their respective inlets 35 and then rotating the collar by means of for example, the operator's handle H shown in FIGURE 1, to cause the pins to follow their slots and shift the collar 40 in an axial direction. When the pins are in the closed or left end of their slots (FIGURE 1) the collar 40 is then in the collet open position, as will later more fully appear. When the pins 43 are in the relief portion 36 of the slots, then the collar is in the collet closed or operative position. Other means may be employed to oscillate the collar 40 and this may also be accomplished automatically by air, electric or hydraulic servo-mechanisms, for example.

The shifting collar also includes a ring 44 which is freely rotatable in the collar on the bronze bearing segments 45 secured in place by screws 46. These circular segments 45 hold the ring 44 captive in the collar and yet permit free rotation of the ring in respect thereto. The ring has an internal cam surface formed by a tapered portion 48 and a generally straight portion 49 and it is this cam surface that is adapted to be engaged by the closer actuating means to be presently described.

An intermediate sleeve 50 is adapted to fit within the collar 40, and its periphery as defined by the projections 51 have a completely free fit with the bore of the collar. The sleeve has internal threads 52 at one end by means of which it is securely engaged on the threaded end of the spindle for rotation therewith. Three circumferentially spaced actuating levers 53 are pivotally connected by pins 54 between each pair of projections 51 and the inner end 55 of these levers extend inwardly past the bore 57 of the sleeve 50. The other ends 56 of the levers 53 are adapted to ride on the cam surfaces 48 and 49 of the collar 40. Axial shifting of the collar causes swinging of the levers 53.

Three chip clearance openings 58 of generally T-shape are provided through the sleeve 50. A guide projection 59 is also provided on the internal surface of bore 57 to insure registry of the chip clearance openings in the sleeve 50 and the collet closer to be next referred to.

The collet closer 60 is of generally tubular shape and fits snugly within the sleeve for sliding engagement therein. The rear edge 61 of this closer is adapted to be engaged by the inner ends 55 of actuating levers 53. This closer has an internal tapered surface 62 that is complementary to and engageable with the tapered surface 24 of the collet. Generally T-shaped chip clearance openings 63 are held in registry with the openings 58 of the sleeve 50 by means of the sleeve guide 59 which is engaged in slot 64 in the closer when the parts are properly assembled.

The closer also has a guide projection 65 extending from its tapered surface which is engaged in a guide slot 57 (FIGURE 2) on the taper 24 of the collet to thereby insure radial alignment of the slits between the collet jaws with the clearance openings 63 and 58.

The alignment of these various chip clearance openings is important to insure proper functioning of the various relatively moving parts.

The oversize nose type of collet chuck provided by this invention is capable of accommodating workpieces of greater diameter than the internal diameter of the collet tube and the large nose houses the mechanism which causes only radial movement of the collet jaws.

Operation

When the collar 40 is in a position where its pins 43 are located in the closed ends 38 of the cam slots, the portions 56 of the crank levers 53 are not located on the cam surface 49 and are consequently not pushed inwardly. In that position, as shown in FIGURE 3, the closer 60 is not shoved by the inner ends 55 of the levers into closing contact with the tapered surface 24 of the collet.

When the collar 40 is oscillated to a position where its pins are located in the relief portions 36, then the collar has been shifted axially to the right, as viewed in the drawings, causing the ends 56 of the levers 53 to ride up on the surface 49 of the cam ring. This movement of the levers causes their inner ends 55 to shove the closer axially into closing engagement with the collet, as shown in FIGURE 2.

The collet is axially stationary in the housing and thereby maintains a fixed position in respect to the machine and, in particular, to any predetermined limit stop of the tool carriage. Thus the workpieces are held in an axially precise position relative to the tool, regardless of the variations in workpiece diameters.

The arrangement provides a double leverage advantage due to the combined action of the collar-cam and the pivoted levers. This results in an easily shifted and quickly operated closer which has shown marked increases in production rates.

Although the collet is axially "fixed" as far as opening or closing its jaws are concerned, it is quickly adjustable in an axial direction for initial set-up or for varying its gripping pressure. This is accomplished by backing off the set screw S, turning the disc and collet tube relative to the spindle which causes axially movement of the collet relative to its tube and to the intermediate sleeve, and then tightening the screw S into holding engagement with another groove 26 in the spindle.

Precise axial positioning of the workpiece relative to the tool is assured with this axially fixed collet by means of which extreme accuracy of the axial dimensions of each workpiece can be obtained.

Various modes of carrying out the invention are contemplated as being within the scope of the following claims particularly pointing out and distinctly claiming the subject matter which is regarded as the invention.

I claim:

1. A collet chuck for a machine tool comprising, a tapered collet having spring jaws and rotatably mounted in an axially fixed position in said machine tool, an axially shiftable closer around said collet and engageable therewith for actuating said jaws, an axially stationary intermediate member around said closer and having shiftable means thereon for axially shifting said closer, and an oscillatable collar having a cam surface which is engageable with said shiftable means for actuating the latter when said collar is oscillated.

2. A collet chuck assembly for use with a machine tool, said assembly comprising a tapered collet having spring jaws and rotatably mounted in an axially position in said machine tool, an axially shiftable closer around said collet and engageable therewith for actuating said jaws, an axially stationary intermediate member around said closer and having means thereon for engagement with and shifting of said closer, and a reaction member non-rotatably mounted around said intermediate member, and an oscillatable collar having a cam connection with said reaction member to cause axial shifting of said collar and engagement with said means for actuating the latter.

3. A collet chuck assembly for use with a machine tool, said assembly comprising a tapered collet having spring jaws and rotatably mounted in an axially fixed position in said machine tool, an axially shiftable closer around said collet and engageable therewith for actuating said jaws, and axially stationary intermediate member around said closer and having means pivoted thereon for shifting said closer, a reaction member secured to said machine tool, and an oscillatable collar on said reaction member and having a camming connection therewith whereby oscillation of said collar causes axial movement thereof, said collar having a tapered surface for engaging and shifting said means and thereby causing shifting of said collet closer.

4. A collet chuck for use with a machine tool of the type having a rotatably driven spindle, said chuck comprising a collet having gripping jaws and rotatably mounted in an axially fixed position in said machine tool, a closer around said collet for actuating said jaws, and axially stationary intermediate member secured to said spindle and rotatable with said closer and collet, said member having closer shifting means thereon, and a collar around said member and non-rotatably mounted on said machine tool but having a camming connection therewith so that oscillation of said collar causes it to be axially displaced and actuate said shifting means.

5. A collet chuck assembly for use with a lathe having a rotatably driven spindle including a free end, said assembly comprising an intermediate sleeve secured on said free end and axially stationary therewith, shiftable means carried on said sleeve, an axially slidable closer in said sleeve and engageable by said means for being shifted thereby, a tapered collet having spring jaws and rotatably mounted in an axially fixed position in said lathe, said collet being located in said closer and engageable thereby to actuate said jaws, and an oscillatable collar having a tapered surface which is axially shifted when the collar is oscillated for actuating said shiftable means.

6. A collet chuck assembly for use with a machine tool having a rotatably driven spindle including a free end, said assembly comprising an intermediate sleeve secured on said free end and axially fixed therewith, shiftable means carried on said sleeve, an axially shiftable closer slidable in said sleeve and engageable by said means for being shifted thereby, a tapered collet having spring jaws and rotatably mounted in an axially fixed position in said machine tool, said collet being located in said closer and engageable thereby to actuate said jaws, and an oscillatable collar having a cam connection with said machine tool, said collar having a tapered surface which is engageable with said shiftable means for actuating the latter when said collar is oscillated.

7. A collet chuck assembly for use with a machine tool having a rotatably driven spindle including a free end, said assembly comprising an intermediate sleeve secured on said free end, shiftable means carried on said sleeve, an axially shiftable closer slidable in said sleeve and engageable by said means for being shifted thereby, a tapered collet having spring jaws and rotatably mounted in an axially fixed position in said machine tool, said collet being located in said closer and engageable thereby to actuate said jaws, a reaction member secured to said machine tool, an oscillatable collar mounted on said reaction member and having a camming connection therewith whereby oscillation of said collar causes axial displacement thereof, said collar having a tapered surface for engaging and shifting said shiftable means.

8. A collet chuck assembly for use with a machine tool having a rotatably driven spindle including a free end, said assembly comprising an intermediate sleeve secured on said free end, shiftable means carried on said sleeve, an axially shiftable closer slidable in said sleeve and engageable by said means for being shifted thereby, a tapered collet having spring jaws and rotatably mounted in an axially fixed position in said machine tool, said collet being located in said closer and engageable thereby to actuate said jaws, an axially shiftable collar mounted on said machine tool, and a ring rotatably mounted in said collar and having a tapered surface against which said shiftable means is adapted to bear for rotation therewith and for shifting thereby as said collar is axially moved.

9. A collet chuck assembly for use with a machine tool having a rotatably driven spindle including a free end, said assembly comprising an intermediate sleeve secured on said free end, shiftable means carried on said sleeve, an axially shiftable closer slidable in said sleeve and engageable by said means for being shifted thereby, a tapered collet having spring jaws and rotatably mounted in an axially fixed position in said machine tool, said collet being located in said closer and engageable thereby to actuate said jaws, a reaction member secured to said machine tool, an oscillatable collar mounted on said reaction member and having a camming connection therewith whereby oscillation of said collar causes axial displacement thereof, a ring rotatably mounted in said collar and having a tapered surface against which said shiftable means is adapted to bear for rotation therewith and shifting thereby as said collar is axially moved.

10. A collet chuck for use with a machine tool of the type having a rotatably driven spindle, said chuck comprising a collet having gripping jaws, a collet tube mounted in an axially fixed position in said spindle for rotation therewith, said tube having a threaded connection with said collet, said tube and spindle having an adjustable connection therebetween whereby relative rotation between said tube and spindle causes axial movement of said collet, a closer around said collet for actuating said jaws, an intermediate member secured to said spindle and rotatable with said closer and collet, said member having closer shifting means thereon, and a collar around said member and nonrotatably mounted on said machine tool but having a camming connection therewith so that oscillation of said collar causes it to be axially displaced and actuate shifting means.

11. In combination with a machine tool having a rotatably driven spindle including a free end, a collet chuck assembly comprising, an intermediate sleeve secured on said free end, shiftable means carried on said sleeve, an axially shiftable closer slidable in said sleeve and engageable by said means for being shifted thereby, a tapered collet having spring jaws, a collet tube mounted in an axially fixed position in said spindle for rotation therewith and having a threaded connection with said collet, an adjustable connection between said tube and spindle for permitting relative rotation therebetween to thereby axially adjust said collet relative to said sleeve, said collet being located in said closer and engageable thereby to actuate said jaws, and means mounted on said machine tool and engageable with said shiftable means for actuating the latter.

12. In combination with a machine tool having a rotatably driven spindle including a free end, a collet chuck assembly comprising, an intermediate sleeve secured on said free end, shiftable means carried on said sleeve, an axially shiftable closer slidable in said sleeve and engageable by said means for being shifted thereby, a tapered collet having spring jaws, a collet tube mounted in an axially fixed position in said spindle for rotation therewith and having a threaded connection with said collet, an adjustable connection between said tube and spindle for permitting relative rotation therebetween to thereby axially adjust said collet relative to said sleeve, said collet being located in said closer and engageable thereby to actuate said jaws, a reaction member secured to said machine tool, an oscillatable collar mounted on said reaction member and having a camming connection therewith whereby oscillation of said collar causes axial displacement thereof, a ring rotatably mounted in said collar and having a tapered surface against which said shiftable means is adapted to bear for rotation therewith and shifting thereby as said collar is axially moved.

References Cited in the file of this patent
UNITED STATES PATENTS

| | | |
|---|---|---|
| 2,370,729 | Hoppe | Mar. 6, 1945 |
| 2,383,156 | Phillips | Aug. 21, 1945 |
| 2,410,344 | Hines | Oct. 29, 1946 |
| 2,436,848 | Benjamin et al. | Mar. 2, 1948 |
| 2,493,926 | Petsche | Jan. 10, 1950 |